(12) United States Patent
Park

(10) Patent No.: US 11,201,480 B2
(45) Date of Patent: Dec. 14, 2021

(54) DEVICE AND METHOD FOR PREVENTING OVERCHARGING

(71) Applicant: HYUNDAI AUTRON CO., LTD., Seoul (KR)

(72) Inventor: Jae-Seong Park, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 175 days.

(21) Appl. No.: 16/456,818

(22) Filed: Jun. 28, 2019

(65) Prior Publication Data

US 2020/0014224 A1 Jan. 9, 2020

(30) Foreign Application Priority Data

Jul. 4, 2018 (KR) .................. 10-2018-0077916

(51) Int. Cl.
*H02J 7/00* (2006.01)
*B60L 58/15* (2019.01)

(52) U.S. Cl.
CPC ............ *H02J 7/0031* (2013.01); *B60L 58/15* (2019.02); *B60Y 2200/91* (2013.01); *B60Y 2300/91* (2013.01); *H02J 7/00302* (2020.01)

(58) Field of Classification Search
USPC .................................. 320/137, 134
See application file for complete search history.

(56) References Cited

U.S. PATENT DOCUMENTS

| 6,084,523 A * | 7/2000 | Gelnovatch ......... H02J 7/00047 340/636.1 |
| 7,183,748 B1 * | 2/2007 | Unno .................... H02J 7/0013 320/134 |
| 2008/0100266 A1 * | 5/2008 | Sobue ................. H01M 10/482 320/134 |
| 2014/0312849 A1 * | 10/2014 | Lee ....................... H02J 7/0068 320/134 |
| 2019/0101598 A1 * | 4/2019 | Cho ....................... H01M 10/42 |

FOREIGN PATENT DOCUMENTS

| KR | 10-0253369 B1 | 4/2000 |
| KR | 10-0471087 B1 | 3/2005 |
| KR | 10-2012-0095608 A | 8/2012 |
| KR | 10-2014-0006571 | 1/2014 |
| KR | 10-2018-0023647 A | 3/2018 |

* cited by examiner

Primary Examiner — Samuel Berhanu
(74) Attorney, Agent, or Firm — Morgan, Lewis & Bockius LLP

(57) ABSTRACT

Disclosed is an overcharging prevention device. The overcharging prevention device includes a micro controller unit (MCU) configured to control a charging or discharging of a battery, a sensor configured to obtain sensing information by sensing the battery, a transceiver configured to transmit the sensing information to the MCU, and a switch configured to cut off a voltage supplied to the battery in response to a signal from the transceiver. The MCU, the transceiver, and the sensor may be supplied with power from an external power supply. According to the present invention, safety specifications can be reinforced because whether the battery is overcharged is detected regardless of whether the MCU operates.

7 Claims, 5 Drawing Sheets

DEVICE AND METHOD FOR PREVENTING OVERCHARGING

CROSS REFERENCE TO RELATED APPLICATION

This application is based on and claims priority under 35 U.S.C. 119 to Korean Patent Application No. 10-2018-0077916, filed on Jul. 4, 2018, in the Korean Intellectual Property Office, the disclosures of which is herein incorporated by reference in their entireties.

BACKGROUND OF THE INVENTION

1. Technical Field

The present invention relates to a device and method for preventing overcharging and, more particularly, to a device and method for preventing the battery of an electric vehicle from being overcharged.

2. Description of the Related Art

An electric vehicle means a vehicle which obtains electric power by driving an AC or DC motor using power of a battery. Performance of the battery has a direct effect on performance of the vehicle.

A battery management system manages such a battery. The system efficiently manages the charging or discharging of each battery cell by measuring a voltage of each battery cell of the battery or the entire voltage and current of the battery, or performs stable control of a corresponding cell by monitoring the state of a cell sensing IC that senses each battery cell.

A battery cell may be overcharged compared to other battery cells although the same charging voltage is applied to the battery cells. Accordingly, the battery management system essentially requires an overcharging prevention device for stopping charging when a battery cell is overcharged.

In general, the overcharging prevention device determines a battery cell to be overcharged when a voltage of the battery cell is a reference value or more, and prevents the overcharging of the battery cell by controlling a switch connected between the battery cell and a load.

If a micro controller unit (MCU) configuring the battery management system is broken or stops operating, it cannot control the battery or outputs an erroneous control command. Accordingly, the lifespan of the battery is reduced, efficiency of the battery is degraded, or an explosion phenomenon may occur. As a result, a serious problem may occur in the safety of the entire vehicle because required power cannot be supplied to the vehicle.

Accordingly, research is continuously carried out on an overcharging prevention device for preventing an emergency situation by detecting the overcharging of the battery although the operation of the MCU is an unstable state. The present invention is related to such research.

PRIOR ART DOCUMENT

Patent Document (Patent Document 1) Korean Patent Application Publication No. 2018-0023647 (Mar. 7, 2018)

SUMMARY OF THE INVENTION

An embodiment of the present invention provides a device and method for preventing overcharging, which have reinforced safety specifications.

An embodiment of the present invention provides a device and method for preventing overcharging, which prevents an emergency situation by determining whether a battery has been overcharged although the operation of an MCU is unstable.

Technical objects of the present invention are not limited to the above-described technical objects, and other technical objects not described above may be evidently understood by a person having ordinary skill in the art from the following description.

An overcharging prevention device according to an embodiment of the present invention includes a micro controller unit (MCU) configured to control a charging or discharging of a battery, a sensor configured to obtain sensing information by sensing the battery, a transceiver configured to transmit the sensing information to the MCU, and a switch configured to cut off a voltage supplied to the battery in response to a signal from the transceiver. The MCU, the transceiver, and the sensor may be supplied with power from an external power supply.

According to an embodiment, the external power supply may supply a first power source to the transceiver and the sensor.

According to an embodiment, the external power supply may supply the MCU and the transceiver with a second power source independent from the first power source.

According to an embodiment, when the transceiver is supplied with the first power source, the transceiver may generate power necessary for an operation of the transceiver using the supplied first power source.

According to an embodiment, when the transceiver is supplied with the second power source, the transceiver communicates with the MCU. In this case, an input/output (TO) level of the transceiver may be identical with an input power level of the MCU.

According to an embodiment, the sensor may generate signals having different waveforms depending on whether the battery is an overcharging state or an overdischarging state.

According to an embodiment, when the battery is the overcharging state, the sensor may generate a signal having a longer period than a signal generated when the battery is a normal state.

According to an embodiment, when the battery is the overcharging state, the transceiver may turn off the switch in order to cut off a voltage supplied to the battery.

According to an embodiment, the transceiver may include an insulation function unit having a communication function for transmitting the sensing information to the MCU and an over power detect (OPD) function for cutting off a voltage supplied to the battery when the battery is an overcharging state.

According to an embodiment, the overcharging prevention device may further include an internal power supply configured to convert power supplied from the external power supply so that the supplied power is supplied to the MCU.

According to an embodiment, the transceiver may be supplied with an input/output (TO) voltage for communication with the MCU from the internal power supply and uses the supplied TO voltage as a reference point of a high level recognition voltage of an open drain type.

A method for a transceiver to prevent overcharging of a battery according to an embodiment of the present invention may include receiving sensing information from a sensor, determining an overcharging state of the battery using the sensing information, and transmitting a control signal to turn off a switch to the switch if, as a result of the determination, the battery is the overcharging state.

DESCRIPTION OF REFERENCE NUMERALS

Figure 1:
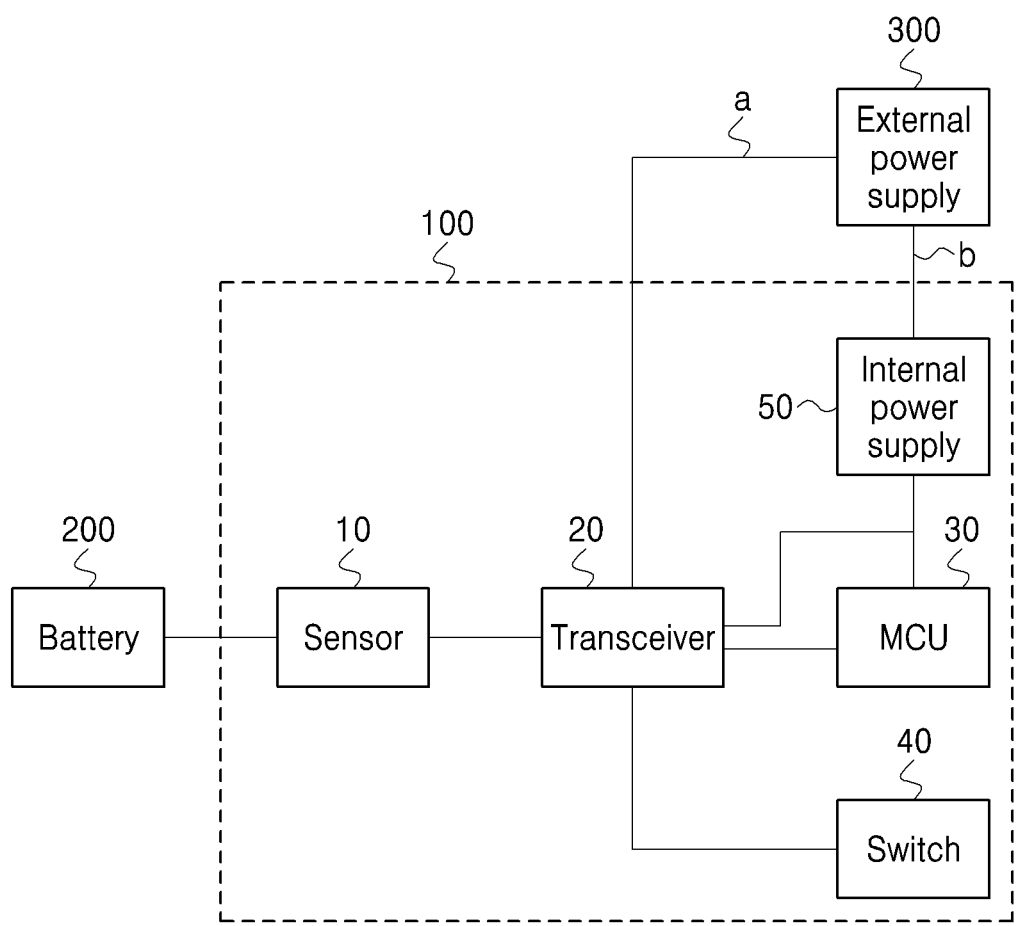
FIG. 1 is a diagram showing the configuration of an overcharging prevention device according to an embodiment of the present invention.

100: overcharging prevention device
10: sensor
20: transceiver
30: MCU
40: switch
50: internal power supply
200: battery
300: external power supply

DETAILED DESCRIPTION

Hereinafter, embodiments of the present invention are described in detail with reference to the accompanying drawings. The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure and to allow those skilled in the art to fully understand the category of the disclosure. The disclosure is defined by the category of the claims. The same reference numerals will be used to refer to the same or similar elements throughout the drawings.

A term "battery 200" used in this specification may be considered to be a battery used as a power source for an electric vehicle, more specifically, a set of a plurality of battery cells that are connected in series or in parallel. All terms (including technical and scientific terms) used in this specification may be used as a meaning which can be understood by a person having ordinary knowledge in the field to which the present invention pertains unless they are defined otherwise. Furthermore, all terms (including technological and scientific terms) used in the specification, unless defined otherwise, will be used as meanings which can be understood by a person having ordinary knowledge in the art to which the present invention pertains in common. Furthermore, terms used and defined in common dictionaries should not be construed as having ideal or excessively formal meanings unless specifically defined otherwise.

A term, such as "comprise (or include)" and/or "comprising (or including)" used in the specification, do not exclude the existence or addition of one or more elements, steps, operations and/or devices in addition to the described elements, steps, operations and/or devices.

Furthermore, it is based on the premise that reference numerals in the drawings and element symbols may be combined and written for convenience sake.

Hereinafter, embodiments of the present invention are described more specifically with reference to the accompanying drawings.

FIG. 1 is a diagram showing the configuration of an overcharging prevention device according to an embodiment of the present invention.

The overcharging prevention device 100 according to an embodiment of the present invention includes a sensor 10, a transceiver 20, a micro controller unit (MCU) 30, and a switch 40.

The sensor 10 obtains sensing information by sensing a current or voltage of a battery 200. The obtained sensing information may be transmitted to the MCU 30 through the transceiver 20.

The sensing information may include a signal indicative of a given waveform. The sensor 10 may generate signals having different waveforms depending on the overcharging or overdischarging of the battery 200.

Figure 2:
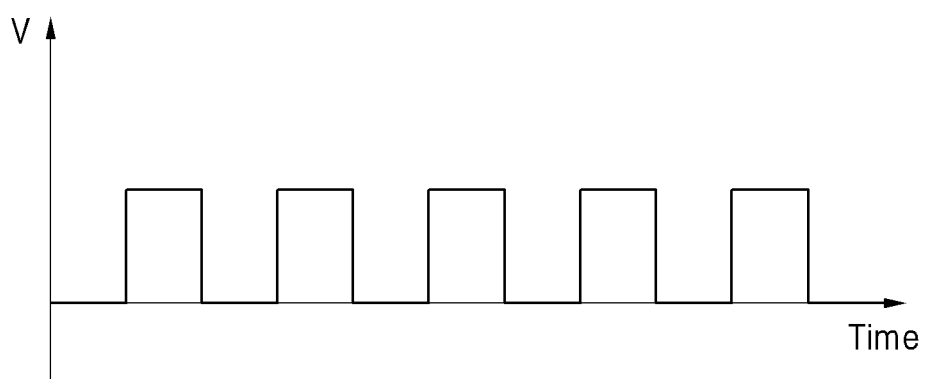
FIG. 2 is a diagram showing an example of a signal generated by a sensor when a battery is a normal state according to an embodiment of the present invention.
Figure 3:
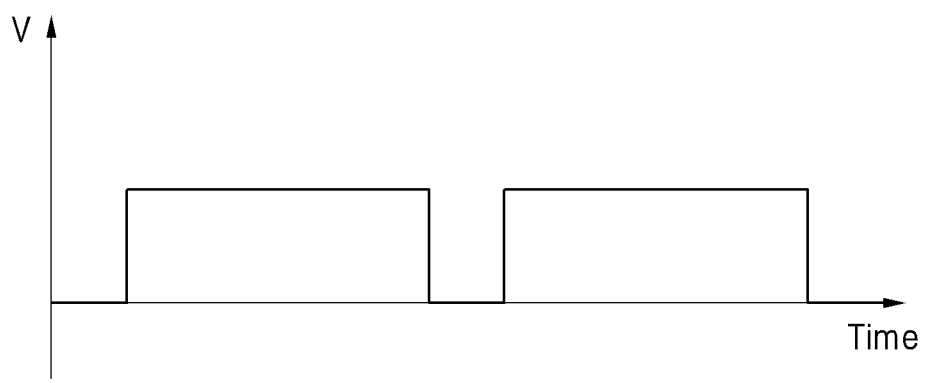
FIG. 3 is a diagram showing an example of a signal generated by the sensor when a battery is an overcharging state according to an embodiment of the present invention.

FIG. 2 is a diagram showing an example of a signal generated by the sensor when the battery is a normal state according to an embodiment of the present invention. FIG. 3 is a diagram showing an example of a signal generated by the sensor when the battery is an overcharging state according to an embodiment of the present invention.

From FIG. 2, it may be seen that the sensor 10 generates a signal of a waveform having a given period when the battery 200 is a normal state.

From FIG. 3, it may be seen that when the battery 200 is an overcharging state, the sensor 10 generates a signal having a longer period than a signal generated when the battery 200 is a normal state.

If the battery 200 is configured with a plurality of battery cells connected in series or in parallel, one or more sensors 10 may be configured so that each of the battery cells can be measured, or a single sensor 10 may measure a single battery cell or all the battery cells.

The transceiver 20 may transmit sensing information, obtained by the sensor 10, to the MCU 30. To this end, the transceiver 20 may include an open drain type communication pin in order to transmit and receive signals to and from the MCU 30.

The transceiver 20 receives a signal, generated when the battery 200 is an overcharging state, from the sensor 10, and turns off the switch 40 in order to cut off a voltage supplied to the battery 200, thus being capable of preventing the overcharging state of the battery 200.

The transceiver 20 may include an insulation function unit 28 for performing an insulation function.

More specifically, the insulation function unit 28 may insulate a communication function for transmitting sensing information to the MCU 30 and an over power detect (OPD) function for turning off the switch 40 in order to cut off a voltage supplied to the battery 200 in response to a signal from the sensor 10.

When the battery 200 is an overcharging state, the switch 40 is turned off in response to a signal from the transceiver 20, thereby being capable of cutting off a voltage supplied to the battery 200.

More specifically, one or more switches 40 may be provided in order to improve the stability of the battery 200. The type and number of switches may be determined by user needs and/or required stability. For example, the switch 40 may be implemented using one or more of switching elements, such as a relay, a contactor, a transistor, and a thyristor, but the present invention is not essentially limited thereto.

The MCU 30 is a processor for controlling the battery 200, and may control the charging or discharging of the battery 200 using the sensing information.

More specifically, the MCU 30 may monitor the state of at least one battery cell configuring the battery 200 using sensing information.

The MCU 30 may calculate the state of charging (SOC) of the battery 200 or a change in resistance within the battery 200 based on a current of the battery 200, a voltage of the battery 200, a voltage of each battery cell, a cell temperature, and a surrounding temperature received from the sensor 10, may calculate an aging state or a state of health (SOH) based on the calculated information, and may generate information providing notification of the state of the battery 200.

The sensor 10, transceiver 20, and MCU 30 of the overcharging prevention device 100 according to an embodiment of the present invention have been described so far. Such elements require a power source for driving, and may be supplied with power from an external power supply 300, that is, a common battery positioned in a vehicle. The external power supply 300 is described more specifically below.

The sensor 10, the transceiver 20, and the MCU 30 may be supplied with power from the external power supply 300.

More specifically, the external power supply 300 may supply the transceiver 20 with a first power source "a" and a second power source "b" independent from the first power source "a", and may supply the second power source "b" to the MCU 30. In this case, the sensor 10 having one end connected to the transceiver 20 may be supplied with the first power source "a", that is, power independent from the second power source "b" supplied to the MCU 30, from the external power supply 300. Furthermore, the sensor 10 may be supplied with power from the battery 200 because the sensor has the other end connected to the battery 200.

The first power source "a" supplied to the transceiver 20 and the sensor 10 may be a high voltage power source. The second power source "b" supplied to the MCU 30 may be a low voltage power source lower than the first power source "a." For example, the first power source "a" may be 12 V and the second power source "b" may be 5 V, but the present invention is not essentially limited thereto.

The transceiver 20 may perform different operations when it is supplied with the first power source "a" and the second power source "b" from the external power supply 300. This is described more specifically below.

First, when the transceiver 20 is supplied with the first power source "a", it may generate power necessary for an operation of the transceiver 20. In this case, the operation of the transceiver 20 means an operation of receiving sensing information from the sensor 10 or controlling the switch 40 using sensing information, but the operation is not essentially limited thereto.

When the transceiver 20 is supplied with the second power source "b", the transceiver 20 may communicate with the MCU 30. More specifically, the transceiver 20 may transmit sensing information to the MCU 30. In this case, an IO level of the transceiver 20 is the same as an input power level of the MCU 30. The transceiver 20 may communicate with the MCU 30 when the IO level of the transceiver 20 and the input power level of the MCU 30 are the same.

As described above, the transceiver 20 is supplied with the first power source "b" independent from power supplied to the MCU 30. Accordingly, the transceiver 20 can perform its function without a need to be supplied with power through the MCU 30, so the overcharging of the battery 200 can be prevented regardless of whether the MCU 30 operates.

The overcharging prevention device 100 according to an embodiment of the present invention may further include an internal power supply 50 for converting power supplied from the external power supply 300.

More specifically, the internal power supply 50 may convert power, supplied from the external power supply 300, into lower power, and may supply the lower power to the transceiver 20 and the MCU 30. For example, the internal power supply 50 may convert power of 12 V, supplied from the external power supply 300, into power of 5 V, and may supply the power of 5 V to the transceiver 20 and the MCU 30. That is, the internal power supply 50 is used when the transceiver 20 and the MCU 30 are supplied with the second power source "b" from the external power supply 300.

The transceiver 20 according to an embodiment of the present invention is described more specifically below with reference to FIG. 4.

Figure 4:
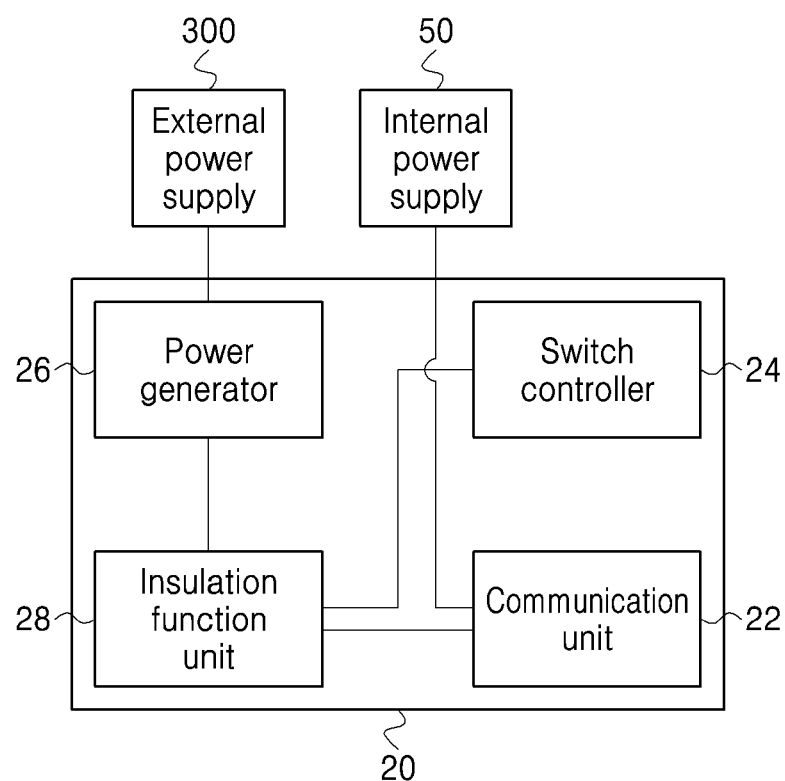
FIG. 4 is a diagram showing the configuration of a transceiver according to an embodiment of the present invention.

FIG. 4 is a diagram showing the configuration of the transceiver 20 according to an embodiment of the present invention.

The transceiver 20 according to an embodiment of the present invention includes a communication unit 22, a power generator 26, an insulation function unit 28, and a switch controller 24.

The communication unit 22 may communicate with the MCU 30. As described above, the communication unit 22 may communicate with the MCU 30 when an input/output (TO) level of the communication unit 22 is identical with an input power level of the MCU 30.

The communication unit 22 is supplied with power necessary for an operation from the power generator 26. The communication unit 22 is supplied with an IO voltage for communication with the MCU 30 from the internal power supply 50, and uses the TO voltage as the reference point of a high level recognition voltage of an open drain type. That is, the communication unit 22 includes an open drain type communication pin for communicating with the MCU 30. The transceiver 20 may communicate with the MCU 30 bilaterally through the communication pin.

The communication unit 22 may be supplied with an input/output (TO) voltage for communication with the MCU 30 from the internal power supply 50, and may use the supplied IO voltage as the reference point of a high level recognition voltage of an open drain type.

The power generator 26 is supplied with the first power source "a" from the external power supply 300, and may generate power necessary for an operation of the transceiver 20. That is, the transceiver 20 does not require a separate power source device because it can directly generate power through the power generator 26.

The insulation function unit 28 may insulating functions performed by the transceiver 20, that is, a communication function for transmitting sensing information to the MCU 30 and an over power detect (OPD) function for detecting a signal from the sensor 10 and controlling the switch 40 in order to cut off a voltage supplied to the battery 200.

As described above, the transceiver 20 does not require a separate external insulation device because it can perform the insulation function through the insulation function unit 28. Accordingly, a total size of the overcharging prevention device 100 can be reduced because the area on which the transceiver 20 is mounted is reduced.

The switch controller 24 may control the switch 40 by detecting a signal from the sensor 10.

More specifically, when a signal having a waveform different from the waveform of a signal generated when the battery 200 is normal is detected from the sensor 10, the switch controller 24 may turn off the switch 40. For example, the signal of the different waveform may be a signal having a longer period than a signal generated when the battery 200 is normal, but the present invention is not essentially limited thereto.

That is, the transceiver 20 can recognize and prevent the overcharging state of the battery 200 through the switch controller 24 when the MCU 30 breaks down or the power supply of the MCU 30 is abnormal.

An operation performed by the transceiver 20 of the overcharging prevention device 100 according to an embodiment of the present invention is described below with reference to FIG. 5.

Figure 5:
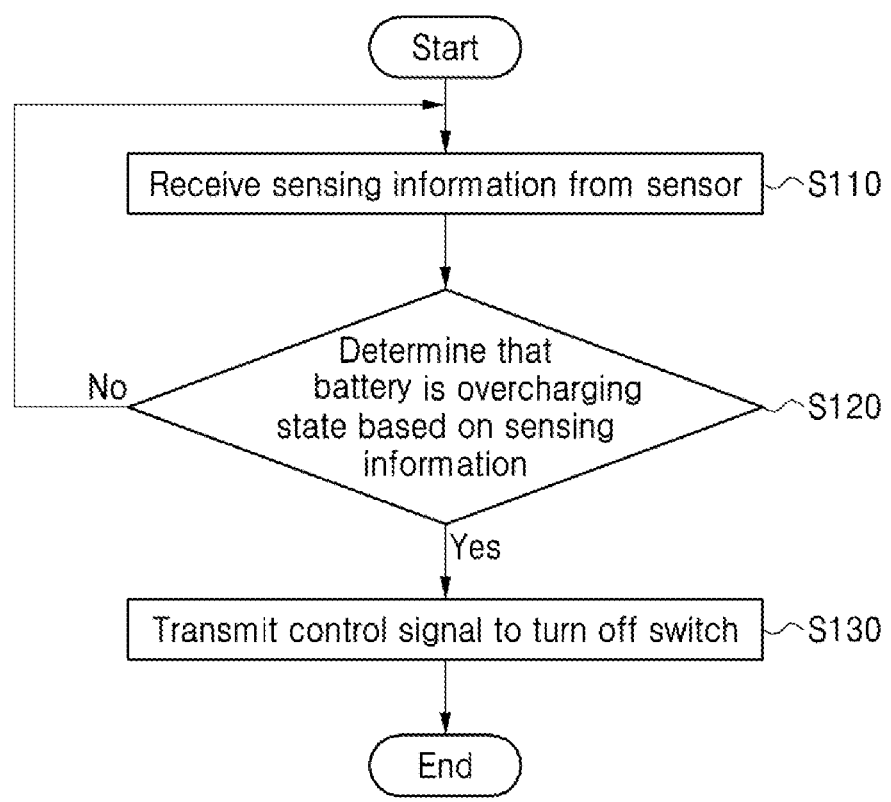
FIG. 5 is a diagram showing a flowchart of an operation performed by the transceiver of the overcharging prevention device according to an embodiment of the present invention.

FIG. 5 is a diagram showing a flowchart of an operation performed by the transceiver of the overcharging prevention device according to an embodiment of the present invention.

The flowchart of FIG. 5 is a flowchart in achieving the objects of the present invention, but it is to be noted that some steps may be added to the flowchart or some steps of the flowchart may be deleted.

First, the transceiver 20 receives sensing information from the sensor 10 (S110).

More specifically, when the transceiver 20 receives sensing information from the sensor 10, the transceiver 20 may transmit the sensing information to the MCU 30. For example, the sensing information may be information obtained by measuring a voltage or current of a battery cell through the sensor 10.

Thereafter, the transceiver 20 determines that the battery 200 is an overcharging state based on the sensing information (S120).

More specifically, the transceiver 20 may determine that the battery 200 is an overcharging state by detecting a sensing signal included in the sensing information, that is, a signal generated by the sensor 10 when the battery 200 is an overcharging state.

The signal generated when the battery 200 is an overcharging state may be a signal having a longer period than a signal generated when the battery 200 is a normal state, but the present invention is not essentially limited thereto.

If the transceiver 20 determines that the state of the battery 20 is not an overcharging state, the transceiver 20 performs step S110 again.

If the transceiver 20 determines that the state of the battery 20 is an overcharging state, the transceiver 20 transmits a control signal to turn off the switch 40 to the switch 40 (S130).

More specifically, the transceiver 20 may turn off the switch 40 by transmitting a control signal to turn off the switch 40, thereby being capable of cutting off a voltage supplied to the battery 200. Accordingly, the overcharging state of the battery 200 can be prevented.

The overcharging prevention device 100 according to an embodiment of the present invention has been described so far.

According to the present invention, safety specifications can be reinforced because an emergency situation is prevented by checking the overcharging state of the battery 200 regardless of whether the MCU 30 operates. Furthermore, the battery 200 can continuously maintain a safe state because the overcharging state of the battery continues to be monitored.

The present invention has an effect in that safety specifications can be reinforced because whether the battery is overcharged is detected regardless of whether the MCU operates.

Furthermore, there are effects in that the lifespan of a battery can be extended and the durability and performance of the battery can be maintained because a voltage of the battery is stably maintained.

Effects which may be obtained in the present invention are not limited to the above-described effects, and other technical effects not described above may be evidently understood by a person having ordinary skill in the art to which the present invention pertains from the following description.

Although the embodiments of the present invention have been described with reference to the accompanying drawings, those skilled in the art to which the present invention pertains may understand that the present invention may be implemented in other detailed forms without changing the technical spirit or essential characteristics of the present invention. Accordingly, it is to be understood that the above-described embodiments are only illustrative, but are not limitative in all aspects.

What is claimed is:

1. An overcharging prevention device, comprising:
    a micro controller unit (MCU) configured to control a charging or discharging of a battery;
    a sensor configured to obtain sensing information by sensing the battery;
    a transceiver configured to transmit the sensing information to the MCU; and
    a switch configured to cut off a voltage supplied to the battery in response to a signal from the transceiver,
    wherein the MCU, the transceiver, and the sensor are supplied with power from an external power supply,
    wherein the external power supply supplies a first power source to the transceiver and the sensor and supplies a second power source, which is independent from the first power source, the MCU and the transceiver,
    wherein, when the transceiver is supplied with the first power source, the transceiver generates power necessary for an operation of the transceiver using the supplied first power source,
    wherein, when the transceiver is supplied with the second power source, the transceiver communicates with the MCU, and
    wherein an input/output (IO) level of the transceiver is identical with an input power level of the MCU.

2. The overcharging prevention device of claim 1, wherein the sensor generates signals having different waveforms depending on whether the battery is an overcharging state or an overdischarging state.

3. The overcharging prevention device of claim 2, wherein when the battery is the overcharging state, the sensor generates a signal having a longer period than a signal generated when the battery is a normal state.

4. The overcharging prevention device of claim 2, wherein when the battery is the overcharging state, the transceiver turns off the switch in order to cut off a voltage supplied to the battery.

5. The overcharging prevention device of claim 1, wherein the transceiver comprises an insulation function unit having a communication function for transmitting the sensing information to the MCU and an over power detect (OPD) function for cutting off a voltage supplied to the battery when the battery is an overcharging state.

6. The overcharging prevention device of claim 1, further comprising an internal power supply configured to convert power supplied from the external power supply so that the supplied power is supplied to the MCU.

7. The overcharging prevention device of claim 6, wherein the transceiver is supplied with an input/output (IO) voltage for communication with the MCU from the internal power supply and uses the supplied IO voltage as a reference point of a high level recognition voltage of an open drain type.

\* \* \* \* \*